United States Patent
Ghata et al.

(10) Patent No.: US 10,445,576 B2
(45) Date of Patent: Oct. 15, 2019

(54) AUTOMATED VEHICLE RECOGNITION SYSTEMS

(71) Applicant: Cox Automotive, Inc., Atlanta, GA (US)

(72) Inventors: Jameel Ghata, Atlanta, GA (US); Leandro F. Lichtensztein, Córdoba (AR); Agustin Caverzasi, Córdoba (AR); Eric F. Romanenghi, Córdoba (AR); Emanuel E. Lupi, Bouwer (AR); Rafael Szuminski, Aliso Viejo, CA (US)

(73) Assignee: Cox Automotive, Inc., Atlanta, GA (US)

( * ) Notice: Subject to any disclaimer, the term of this patent is extended or adjusted under 35 U.S.C. 154(b) by 0 days.

(21) Appl. No.: 15/715,148

(22) Filed: Sep. 25, 2017

(65) Prior Publication Data
US 2018/0173953 A1  Jun. 21, 2018

Related U.S. Application Data

(60) Provisional application No. 62/399,019, filed on Sep. 23, 2016.

(51) Int. Cl.
| | | |
|---|---|---|
| *G06K 9/00* | (2006.01) | |
| *G06K 9/62* | (2006.01) | |
| *G08G 1/017* | (2006.01) | |
| *G06K 9/40* | (2006.01) | |
| *G08G 1/015* | (2006.01) | |

(52) U.S. Cl.
CPC ....... *G06K 9/00664* (2013.01); *G06K 9/6202* (2013.01); *G06K 9/627* (2013.01); *G06K 9/6256* (2013.01); *G06K 9/40* (2013.01); *G06K 2209/23* (2013.01); *G08G 1/015* (2013.01); *G08G 1/0175* (2013.01)

(58) Field of Classification Search
CPC ............ G06K 9/00664; G06K 9/6202; G06K 9/6256; G06K 9/627; G06K 9/40; G06K 9/6278; G06K 2209/23; G08G 1/015; G08G 1/0175

See application file for complete search history.

(56) References Cited

U.S. PATENT DOCUMENTS

| | | | | |
|---|---|---|---|---|
| 9,685,079 | B2 * | 6/2017 | Bulan | G08G 1/0175 |
| 9,996,772 | B2 * | 6/2018 | Ahmed | G06K 9/66 |
| 2006/0088207 | A1 * | 4/2006 | Schneiderman | G06K 9/00241 |
| | | | | 382/159 |
| 2010/0322476 | A1 * | 12/2010 | Kanhere | G08G 1/0175 |
| | | | | 382/103 |
| 2011/0243457 | A1 * | 10/2011 | Miyajima | G01C 21/3602 |
| | | | | 382/209 |
| 2016/0306264 | A1 * | 10/2016 | Chu | G03B 17/563 |

FOREIGN PATENT DOCUMENTS

WO    WO-2004042673 A2 *    5/2004   ............ G08G 1/0175

* cited by examiner

*Primary Examiner* — Shefali D Goradia
(74) *Attorney, Agent, or Firm* — Eversheds Sutherland (US) LLP

(57) ABSTRACT

This disclosure describes a device and methods for determining an image. The disclosure further describes devices and methods for detecting a vehicle in the image; extracting at least one first feature from the image; determining a match between each of the at least one first feature and each of at least one second features stored the at least one memory; and determining a ranking of the each of the at least one first feature.

18 Claims, 12 Drawing Sheets

AUTOMATED VEHICLE RECOGNITION SYSTEMS

CROSS REFERENCE TO RELATED APPLICATION

This application claims the benefit of U.S. Provisional Patent Application No. 62/399,019 filed Sep. 23, 2016, the disclosure of which is incorporated herein by reference as set forth in full.

TECHNICAL FIELD

This disclosure generally relates to systems and methods for identifying vehicle characteristics and, more particularly, classifying vehicles based on vehicle characteristics.

BACKGROUND

The determination of a vehicle in a photograph can be a difficult task. While certain attributes are apparent, such as color, and sometimes even the even manufacturer, other features that fully identify the vehicle are not readily apparent at first glance. For instance, each manufacturer may have a dozen or more models, and the models vary year to year in design. Within a certain model of vehicle, the trim (or versions) and/or option packages may vary wildly. To determine a trim and/or options of the vehicle one may need to be able to discern from an image or series of images one or more of the bumper configuration, the headlight style//type, the size and/or design of the wheel rims, the exhaust configuration, and/or other indicia that may adorn a certain version and/or option package. This is a time consuming and complicated task given the number of possible model and option variations considering production cars form the 1950's and before are still on the road today.

DETAILED DESCRIPTION

Example embodiments described herein provide certain systems, methods, and devices, for providing vehicle classification information to a mobile device over a wireless network.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The embodiments disclosed herein can be used to identify images in a photograph and more specifically features and/or characteristics about images using detection and estimation techniques. The images may be automobiles and the features and/or characteristics may be design features and/or characteristics unique to the year, make, and model of the vehicle, or may be aftermarket features or customizations. The detection (features extraction) techniques can comprise at least one neural network that identifies discriminative object features, such as headlights or brake lights, on the outside or inside of the vehicle. The estimation (features classification) techniques can comprise at least one Joint Bayesian signal processing instruction set that cause a processor to categorize and score the discriminative object features against known discriminative object features in order to classify the discriminative object features. These techniques can be used to determine the year, make, and model of a car based on the discriminative object features.

Figure 1:
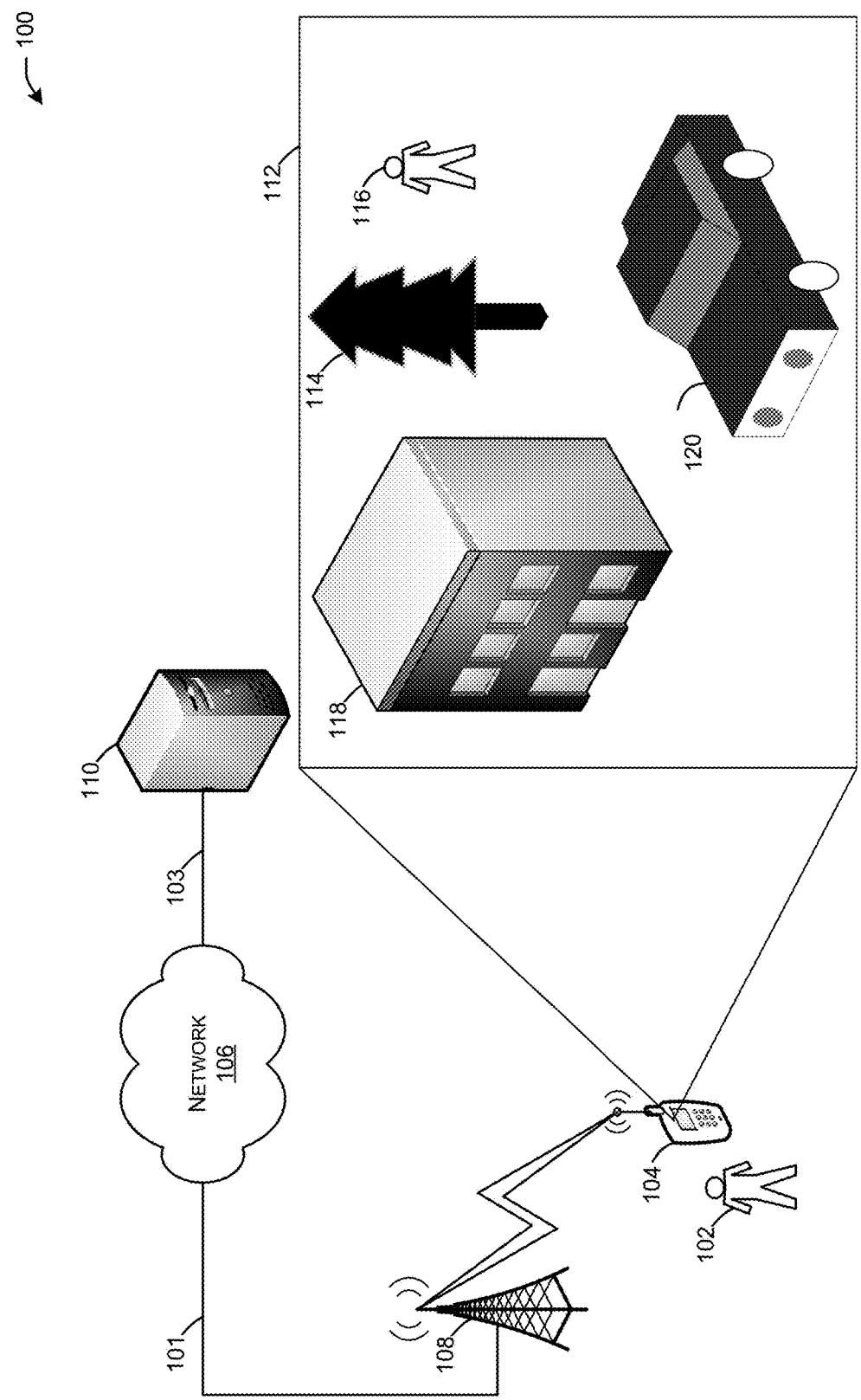
FIG. 1 depicts an example network environment of an illustrative wireless network, according to one or more example embodiments of the disclosure.

With reference to FIG. 1, an exemplary network environment 100 is illustrated. Exemplary network environment 100 comprises a user 102 and a mobile device 104 associated with the user 102. The mobile device 104 may communicate wirelessly with, for example, a cellular base station 108. The cellular base station 108 may communicate with Network 106 via a connection 101. The cellular base station 108 may implement at least one cellular standard including, but not limited to Global System for Mobile Communications (GSM), Enhanced Data rates for GSM Evolution (EDGE) and/or any of its variants, Universal Mobile Telecommunications System (UMTS), UMTS Terrestrial Radio Access (UTRA), High Speed Packet Access (HSPA), and Long Term Evolution (LTE). The mobile device 104 may communicate with cellular base station 108 using a Code Division Multiple Access (CDMA), Frequency Division Multiple Access (FDMA), Time Division Multiple Access (TDMA), Space Division Multiple Access (SDMA) network connection, and/or any other suitable standard. The base station 108 may communicate with server 110 via a network 106. The network 106 may be at least one intranet (e.g., enterprise networks) and/or the Internet. For example, in some embodiments the network 106 may comprise at least one enterprise network and/or virtual private networks overlaid on the Internet that enable the base station 108 to communicate with server 110 along a dedicated path of routers reserved for the execution of at least one instruction corresponding to the methods disclosed herein. The base station 108 may communicate with network 106 over the connection 101 which may be a wireless, wired, and/or combination of wired and wireless connections. The server 110 may communicate with the network 106 over the connection 103. The connection 103 may be a wireless, wired, and/or combination of wired and wireless connections. The server 110 may send and receive data packets to and from the mobile device 104 respectively over the connection 103, the network 106, the connection 101, and the base station 108.

The mobile device 104 may be a mobile phone, tablet, or Personal Data Assistant. The mobile device 104 may comprise, among other things, at least one memory, at least one processor, at least one display, at least one camera, at least one microphone, at least one speaker, at least one wireless radio, etc. The at least one camera may comprise one or more sensors that can detect light reflected from at least one object (e.g., vehicle) in the field of view of a lens in the camera. The at least one processor may receive at least one signal corresponding to the light received from the reflected objected and may execute at least one instruction, stored in the memory, that cause the at least one processor to perform at least one post-processing image analysis or signal processing before converting the signal into a digital format that can be sent to the server 110 using the at least one wireless radio. The wireless radio may be a cellular radio, wireless personal area network (WPAN) radio (e.g., Wireless Fidelity (Wi-Fi) radio), a last mile wireless radio (e.g., Worldwide Interoperability for Microwave Access radio), and/or any other suitable standard.

An application may be executed on mobile device 104, for vehicle check-in at auction locations. The application may provide a user with the ability to take a picture of a vehicle, detect the vehicle in the picture, then send an image of the detected vehicle in the picture to a server that may determine the year, make, and model of the vehicle. The server may return information about the vehicle in addition to the year, make, and model, such as the trim, engine type, drivetrain, transmission, exterior color, interior color, factory options available for that vehicle (in some embodiments, these are selectable for user confirmation), mileage, mileage type, and unknown mileage. Some of this information may auto-populate fields corresponding to the different information and edit information associated with the vehicle including the Vehicle Identification Number, year, make, model, and trim of each vehicle while at the auction.

The processor may execute at least one instruction set that may cause the processor to display on the display at least one screen comprising information about the vehicle. The instructions may cause the processor to display one or more pieces of information in different locations on the same screen, or on multiple screens that can be accessed by a user (e.g., the user 102), by interacting with the mobile device 104. For example, the processor may execute instructions that cause the processor to display screens comprising information about the user and/or object including, but not limited to, a user authentication screen, a session/vehicle listing screen, vehicle book-in information screen, and/or application settings screen. The application settings screen may comprise one or more screens. For example, a first screen may be a general settings screen, which may comprise miscellaneous settings for the operation of the application. A second screen may comprise an area in which an auction service may be displayed to a user. The vehicle book-in information may include client information and/or vehicle information comprising but not limited to a vehicle identification number (VIN), barcode scanning screen that may enable a user to scan a barcode on the object, base vehicle configuration, vehicle options, auction services, and/or photographs of the object. The vehicle book-in information may be used to log information associated with the car in a database in a server (e.g., server 110).

The application may include a user authentication screen that may include at least two fields, corresponding to a login and password associated with the user, on the authentication screen that may cause the processor to receive an input from the display as a result of the user entering a login and password in the at least two fields. The user may be authenticated by the processor by comparing a login and password to a list of logins and passwords. In some embodiments, biometric information gathered from the mobile device 104 may be used instead of the login and password. For example, a retina scan or finger print scan of the user can be used to authenticate a user. In some embodiments, the processor of authenticating the user may be performed by at least one processor on the server 110.

The session/vehicle listing screen may list previously entered/configured vehicles by the user. The session/vehicle listing screen may also comprise at least one field that may cause the processor to receive an input from the display as a result of the user entering a new vehicle to be added to the session/vehicle listing, and/or editing an existing vehicle in the session/vehicle listing. The session/vehicle listing may include vehicle parameters, including among other things, the VIN, Year, Make, Model, and Trim of each vehicle in the session/vehicle listing. The session/vehicle may comprise at least one entry. The at least one entries may be sorted by the date on which the vehicle was added to the session/vehicle listing, though sorting may be done according to any vehicle parameter. In some embodiments, the mobile device may display a screen that may enable a user to input a client number and/or a client name, or industry credentials such as Auction Access 5 Million and 100 Million numbers. In other embodiments, the mobile device may display a screen that may enable the user to enter the VIN and/or other information associated with a vehicle by manual entry, scan of a barcode on a vehicle with, for example, a hardware scanner dongle or the camera of the mobile device. In some embodiments the processor may execute one or more computer executable instructions that may cause the processor to execute a camera decoding engine. The camera decoding engine may decode a barcode associated with a vehicle that is encoded in a Code 39, Datamatrix, and/or Quick Response (QR) code. In some embodiments, the mobile device may display a screen comprising a plurality of auto-populating select fields and manual entry text fields. For example, the plurality of auto-populating select fields may comprise vehicle configuration information, including but not limited to, the year, make, model, trim, engine, drivetrain, transmission, exterior color, interior color, mileage, mileage type, and/or unknown mileage. In some embodiments all selected fields may auto-select if only a single option is available. The selected fields may pre-populate auto-select values based on data from a dataset of vehicles.

In some embodiments the mobile device may display a screen comprising a list of vehicle options matching vehicles in the dataset. The options may comprise equipment that is included in the vehicle and/or optional equipment that can be added to the vehicle, for instance, this could be the options that were available from the factory for the given, vehicle make, model and trim. In some embodiments a list of application predefined services may be displayed on the mobile device that may enable a user to select any applicable services.

The server 110 may be a single server, or a plurality of servers. The server 110 may be a server in a cloud computing environment, or it may be an enterprise server. The server 110 may be represented in any electronic addressable format, and can exist as a standalone device, or may be one of several servers in a server farm. It may be a physical or virtual server. It may include at least one processor, memory, other hardware, and one or more instructions stored on the memory. The memory may store one or more computer-executable instructions that may cause the processor to detect an object (e.g., vehicle) of interest in a photograph (taken by the camera), determining at least one discriminative feature of the object by executing one or more other computer-executable instructions that cause the processor to apply a neural network (e.g., convolutional neural network (CNN)) to the object, classifying the at least one discriminative feature, and matching the classified discriminative feature(s) to one or more stored classified discriminative features associated with the object stored in the memory. In some embodiments, the stored classified discriminative feature(s) may be stored in the server 110. In other embodiments, the stored classified discriminative feature(s) may be dispersed over one or more cloud servers.

The camera may capture at least one object in a photograph that is in the field of view of the camera. More precisely, the sensor (e.g., a charged coupled device (CCD) or complementary metal oxide semiconductor (CMOS)) may receive a reflection of light from one or more objects that are not a target of an object of interest. For example, the camera may be positioned in such a way that the object of interest (e.g., a vehicle) is not the only object captured in the photograph. The photograph (e.g., the photograph 112) may include objects of a building (e.g., the building 118), a tree (e.g., the tree 114), and a human being (e.g., the human being 116). The systems, methods, and devices disclosed herein detect the vehicle (e.g., the vehicle 120), determine specific discriminative features about the vehicle, classify the discriminative features of the vehicle in the picture, and compare the discriminative features of the vehicle in the picture to discriminative features of the same or a similar vehicle that are stored in the memory or one or more storage discs in the server 110. The comparison may be based on a joint Bayesian method of comparing the vehicle in the picture to discriminative features of pictures of the same or similar vehicles.

Because the object of interest is the vehicle 120, the memory in the mobile device 104 and/or the memory in the server 110 may store one or more computer-executable instructions that may be executed by the at least one processor of the mobile device 104 and/or the at least one processor in the server 110 to cause the at least one processors of the mobile device 104 and/or the server 110 to detect the location of the vehicle in the picture, for instance, using image recognition processing.

Figure 2:
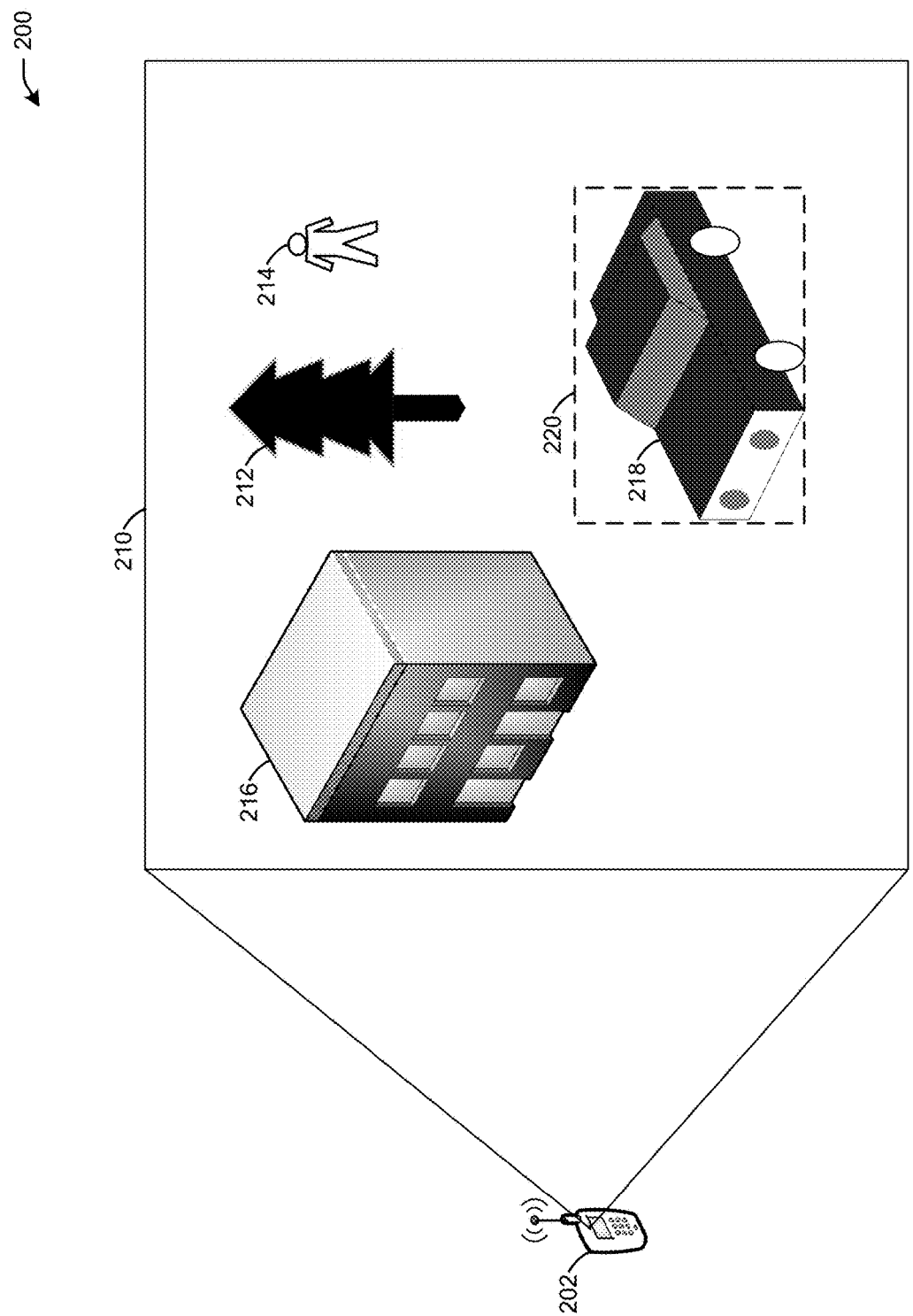
FIG. 2 depicts an exemplary photograph, according to one or more example embodiments of the disclosure.

FIG. 2 depicts an exemplary photograph 210, according to one or more example embodiments of the disclosure. The photograph 210 may be the same as the photograph 112, the mobile device 202 may be the same as the mobile device 104, the building 216 may be the same as the building 118, the tree 212 may be the same as the tree 114, the human being 214 may be the same as the human being 116, and the vehicle 218 may be the same as the vehicle 120. The at least one processor of the server (not shown in FIG. 2) and/or the at least one processor of the mobile device 202 may detect the location of the vehicle 218 by predicting the location of the vehicle 218 in the photograph 210 using a first neural network (e.g., region based convolutional neural network (RCNN)). At least one vehicle surrounding region (e.g., the vehicle surrounding region 220) may be or may not be displayed on a screen on the mobile device 202. In some embodiments, the at least one processor on the mobile device 202 may cause the display of the mobile device 202 to display a screen with the vehicle surrounding region 220 surrounding or including the vehicle 218. In some embodiments, the vehicle surrounding region 220 may be a square, in other embodiments in may be elliptical. Yet in other embodiments, the vehicle surrounding region 220 may trace the contours of the surface or outer edge of the vehicle 218. For example, the region 220 may be the outline of the vehicle 218.

In some embodiments, the at least one processor of the server 210 may execute one or more computer-executable instructions stored in memory that may cause the at least one processor to send at least one signal comprising instructions that may cause the at least one processor of the mobile device 202 to display a screen with the vehicle surrounding region 220, which includes the vehicle 218. After the vehicle surrounding region 220 is applied to the vehicle 218, regardless of whether the vehicle surrounding region 220 is displayed on a screen of the display of the mobile device 202, the at least one processor of the server and/or the at least one processor of the mobile device 202 may execute one or more computer-executable instructions stored in the memory of the server or the memory of the mobile device 202, respectively, that may cause the at least one processor of the server and/or the at least one processor of the mobile device 202 to extract characteristics unique to the vehicle 218. The instructions may cause the at least one processors to locate or identify the one or more discriminative characteristics (features) of the vehicle 218. For example, a discriminative feature of the vehicle 218 may be the shape of the headlights on the vehicle, the location of each head light relative to some other point on the vehicle (e.g., decal in the center of the grill of the vehicle), and/or the shape and or size of the wheels on the vehicle.

Figure 3:
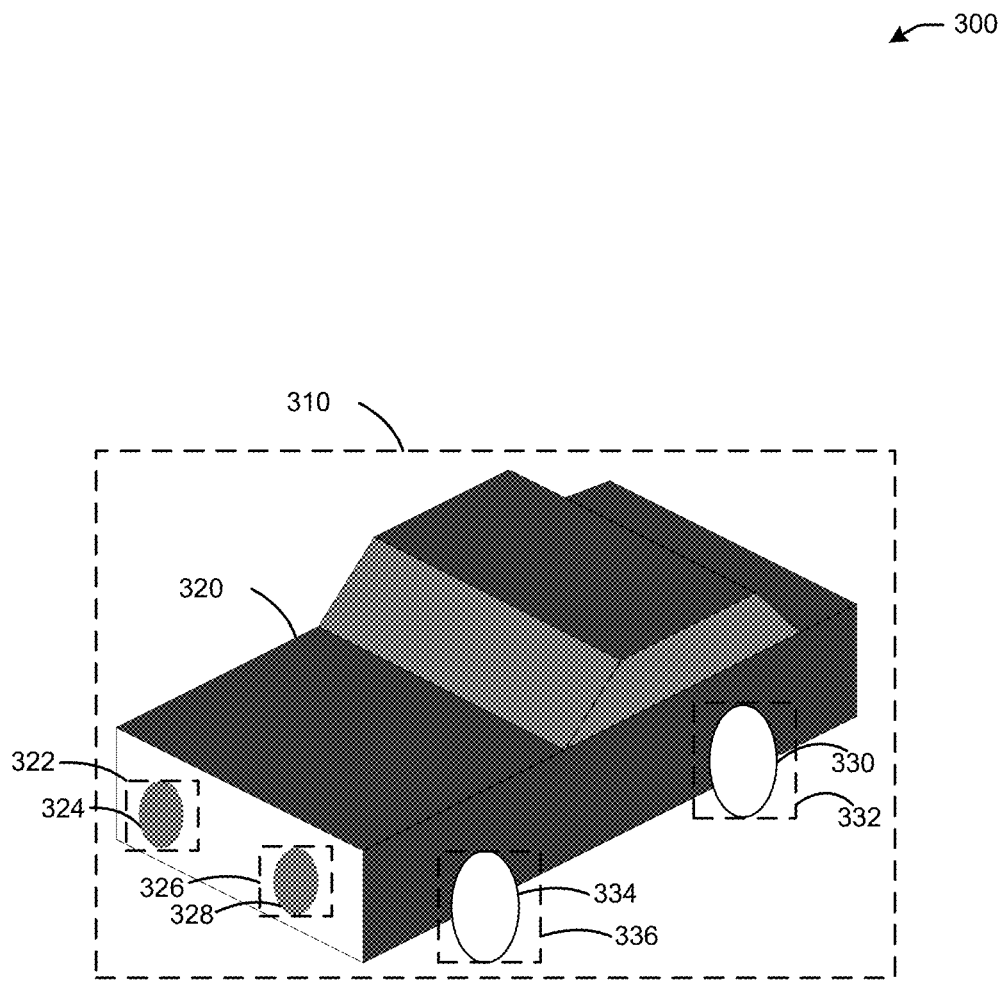
FIG. 3 depicts an exemplary feature extraction image used in a method for vehicle classification, according to one or more example embodiments of the disclosure.

FIG. 3 depicts an exemplary feature extraction image 300, according to one or more example embodiments of the disclosure. The at least one processor of the server and/or a mobile device (not shown in FIG. 3) may execute one or more computer-executable instructions stored in a memory of the server or the memory of the mobile device respectively, that may cause the at least one processor of the server and/or the mobile device to locate at least one feature from the photograph 310 (which may be a portion of a photograph, such as a surrounding region) corresponding to at least one of the most discriminative features of the vehicle 320. The one or more computer-executable instructions may cause the processors to locate the at least one feature in the photograph 310 using a second neural network (e.g., a convolutional network). For example, at least one of the most discriminative features of the vehicle 320 may be represented by a N-dimensional vector, where N is an natural number. For example, at least one first vector may represent the headlights 324 and 328 and at least one second vector may represent the wheels 334 and 330. The at least one processor of the server and/or the at least one processor of the mobile device may determine feature extraction regions (e.g., the feature extraction regions 322 and 326 around the headlights 324 and 328, respectively, and the feature extraction regions 336 and 332 around the wheels 334 and 330, respectively). The at least one processor of the server and/or the mobile device may classify the at least one of the most discriminative features by executing one or more instructions stored in the memory of the server or the mobile device, wherein the instructions may cause the processor to calculate a joint Bayesian ratio by comparing the at least one of the most discriminative features to one another by taking differences between the at least one of the most discriminative features and determining a probability of the differences based on (or conditioned on) a hypothesis that the at least one of the most discriminative features are the same (intrapersonal) or are not the same (extrapersonal). A similarity score may be assigned to each of the comparisons of the at least one of the most discriminative features.

The at least one processor of the server and/or the mobile device may compare the similarity score to a similarity score corresponding to at least one discriminative feature stored in the memory of the server and/or the mobile device, wherein the at least one discriminative feature stored in the memory of the server and/or the mobile device corresponds to a training set of at least one feature associated with other images of a vehicle of the same year, make, and/or model of the vehicle in the photograph. Based on the similarity score comparison the at least one processor of the server and/or the mobile device may determine which of the at least one of the most discriminative features corresponds to the images of the vehicle in the training set. The best similarity score may be a score that minimizes the difference between the similarity score and a similarity score corresponding to the at least one discriminative feature stored in the memory of the server and/or the mobile device corresponding to the training set. For example, the similarity score may be compared to the similarity score corresponding to the at least one discriminative feature by taking a norm of the difference between the similarity score and the similarity score corresponding to the at least one discriminative feature. If the similarity score and the similarity score corresponding to the at least one discriminative feature are p-dimensional vectors, then the similarity score corresponding to the at least one discriminative feature, from the training set, that minimizes the difference between the similarity score and the similarity score corresponding to the at least one discriminative feature may be determined to be the similarity score corresponding to the at least one discriminative feature that most closely matches the discriminative feature in the images.

In some embodiments, augmented reality may be used to overlay information determined by the processes disclosed herein, over an image of the vehicle. For example, the make, model, year, trim, other options, damage, vehicle component attributes (e.g., 300 HP, 6 speed manual transmission, paddle shifters), etc. may be overlaid on images, such as a 360 degree image.

Figure 4:
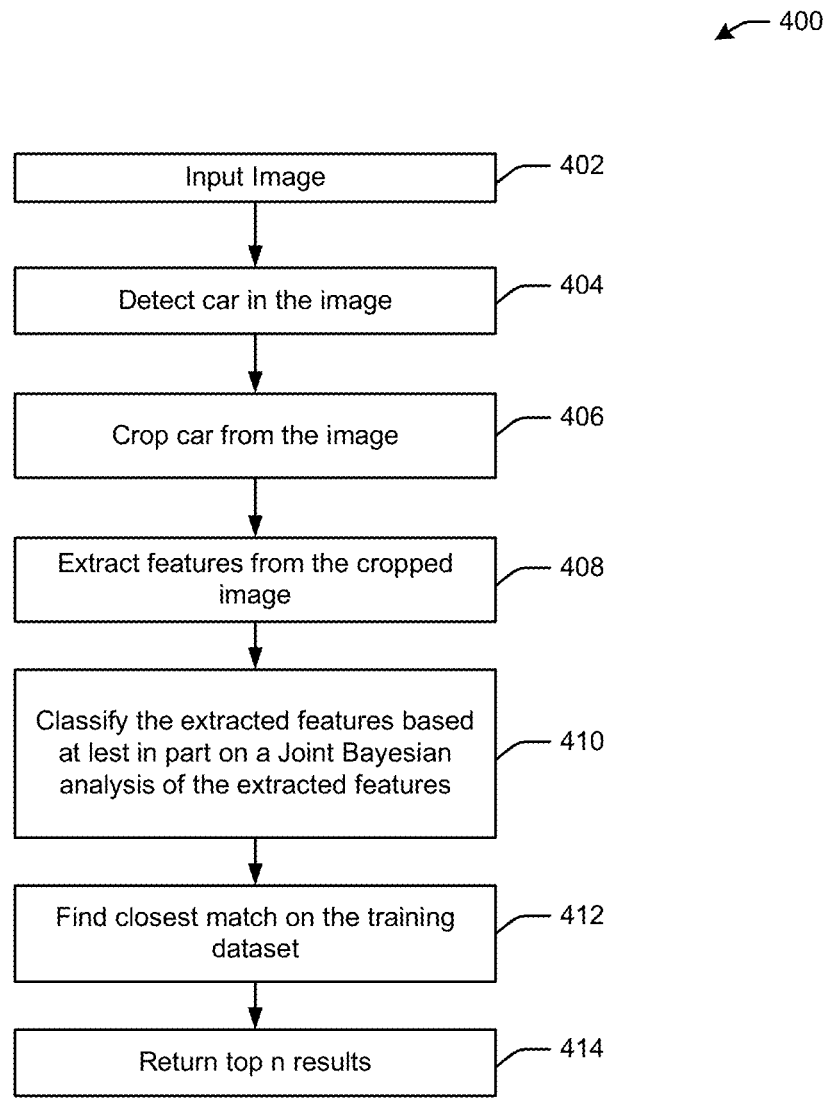
FIG. 4 depicts an exemplary flow diagram of an illustrative method for implementing vehicle classification, according to one or more embodiments of the disclosure.

FIG. 4 depicts an exemplary flow diagram of an illustrative method for implementing vehicle classification, according to one or more embodiments of the disclosure. The at least one processor in the server and/or the mobile device may execute one or more computer-executable instructions that may cause the at least one processor to execute process 400. In step 402 the at least one processor in the server and/or the mobile device may input an image (photograph) comprising at least one object. The image may be an image received from a camera of the mobile device, as explained above. The image may comprise among other things, a vehicle and/or one or more other objects. For example, the image may include a building (e.g., the building 216), a tree (e.g., the tree 212), a human being (e.g., the human being 214), and/or a vehicle (e.g., the vehicle 218).

The at least one processor of the server and/or the mobile device may execute one or more computer-executable instructions that may cause the processor to detect a car (vehicle) in the image (step 404). The at least one processor may detect a vehicle in the image by executing one or more computer executable instructions that cause the at least one processor to apply one or more portions of the image to a neural network (e.g., a regional convolutional neural network (RCNN)). For example, the at least one processor may apply the RCNN to determine a vehicle surrounding region of the vehicle thereby enabling the processor to detect the location of the vehicle in the image, and therefore detect the vehicle itself.

After the at least one processor detects the vehicle in the image, the at least one processor may crop the car from the image by applying the vehicle surrounding region to the car (step 406). This step is not required, as the subsequent steps may be performed on the image without cropping. The at least one processor may then execute one or more computer-executable instructions that may cause the at least one processor to extract at least one feature from the cropped image (step 408). In some embodiments, the at least one processor may execute one or more computer-executable instructions that may cause the at least one processor to apply the output of the RCNN to a convolutional neural network to determine at least one most discriminative object features using one or more N-dimensional vectors. In some embodiments the convolutional neural network may be pre-trained in order to generate representations for novel tasks by applying transfer learning, fine tuning the entire network by training it end-to-end with backpropagation and stochastic gradient descent for vehicles make, model, and year classification tasks. In some embodiments a loss function for triplet loss during the training process may be used to improve features representations.

In step 410, the at least one processor may execute one or more computer-executable instructions that may cause the at least one processor to classify the extracted features based at least in part on a joint Bayesian analysis of the extracted features. The at least one processor may execute the one or more computer-executable instructions that cause the at least one processor to apply the joint Bayesian classification by computing a joint Bayesian ratio by comparing the at least one of the most discriminative features to one another by taking differences between the at least one of the most discriminative features and determining a probability of the differences based on (conditioned on) a hypothesis that the at least one of the most discriminative features are the same (intrapersonal) or are not the same (extrapersonal). The hypothesis that the at least one of the most discriminative features are the same may be represented by a binary value of 1 or 0, and the hypothesis that they are not the same may be represented by the opposite binary value. A feature vector may be used to represent the classification of the at least one most discriminative object features, and the at least one processor may transform the feature vector to a different space in which the features from the same classification are closer among the at least one most discriminative object features and the features with a different classification are further apart.

In step 412, the at least one processor may execute one or more computer-executable instructions that may cause the at least one processor to determine the closest match of the at least one most discriminative features to at least one of the most discriminative features in a training dataset. The at least one processor of the server and/or the mobile device may compare a calculated similarity score to a similarity score corresponding to at least one discriminative feature stored in the memory of the server and/or the mobile device, wherein the at least one discriminative feature corresponds to a training set of at least one feature associated with other images of a vehicle of the same year, make, and/or model of the vehicle in the photograph. The optimal calculated similarity score may be a score that minimizes the difference between the calculated similarity score and a similarity score corresponding to the at least one discriminative feature stored in the memory of the server and/or the mobile device corresponding to the training set. For example, the similarity score may be compared to the similarity score corresponding to the at least one discriminative feature by taking a norm of the difference between the similarity score and the similarity score corresponding to the at least one discriminative feature. If the similarity score and the similarity score corresponding to the at least one discriminative feature are p-dimensional vectors, then the similarity score corresponding to the at least one discriminative feature, from the training set, that minimizes the difference between the similarity score and the similarity score corresponding to the at least one discriminative feature may be determined to be the similarity score corresponding to the at least one discriminative feature that most closely matches the discriminative feature in the images.

In step 414, the at least one processor may execute one or more computer-executable instructions that may cause the at least one processor to return the top n scores (e.g., ranking the top n scores), wherein n may be any natural number, of the at least one discriminative features. After the processor executes the one or more computer-executable instructions that cause the at least one processor to return the top n at least one discriminative features, the process may end.

Figure 5:
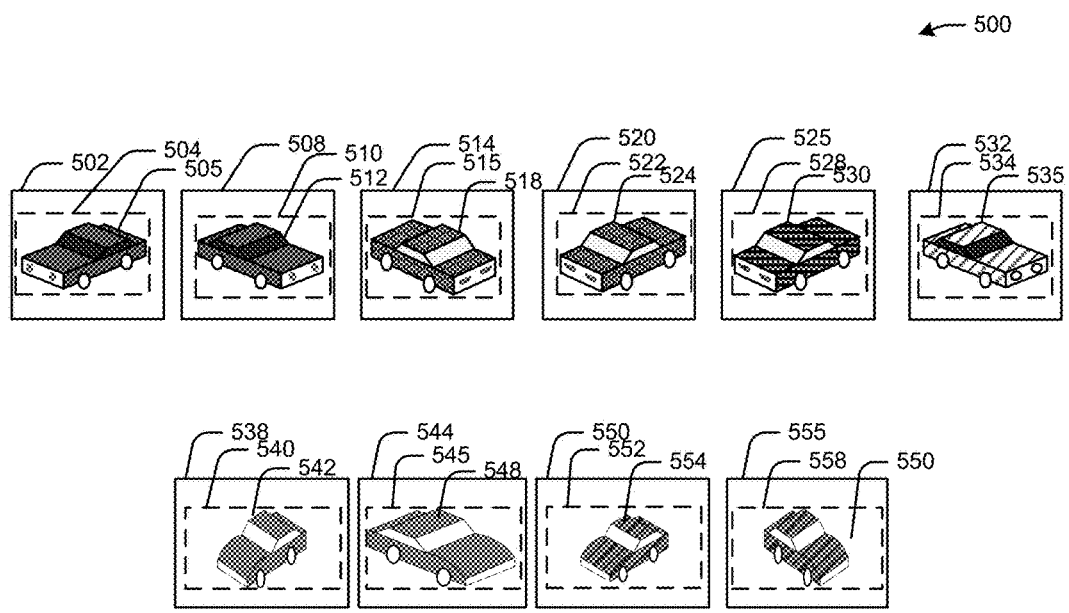
FIG. 5 depicts an exemplary data set of extracted images used in a method for vehicle classification, according to one or more embodiments of the disclosure.

FIG. 5 depicts an exemplary dataset of an illustrative method for implementing vehicle classification, according to one or more embodiments of the disclosure. Data set 500 may comprise at least one image stored on a read/write disc communicatively coupled to the at least one processor of the server. Data set 500 may comprise images 502, 508, 514, 520, 525, 532, 538, 544, 550, and 555. Each of the images may comprise cropped images of the same vehicle with different designs and/or colors. For example, the vehicle 548 and the vehicle 554 may be the same vehicle, but may have different orientations in images 544 and 550, respectively, and/or may have different colors or other external features. For instance, the design of the vehicle 548 is uniform, whereas the design of the vehicle 554 is stripped. The vehicles 505, 512, 518, 524, 530, 535, 542, 548, 554, and 550 may be cropped images from a larger image (not shown) as indicated by the vehicle surrounding regions 504, 510, 515, 522, 528, 534, 540, 545, 552, and 558.

Figure 6:
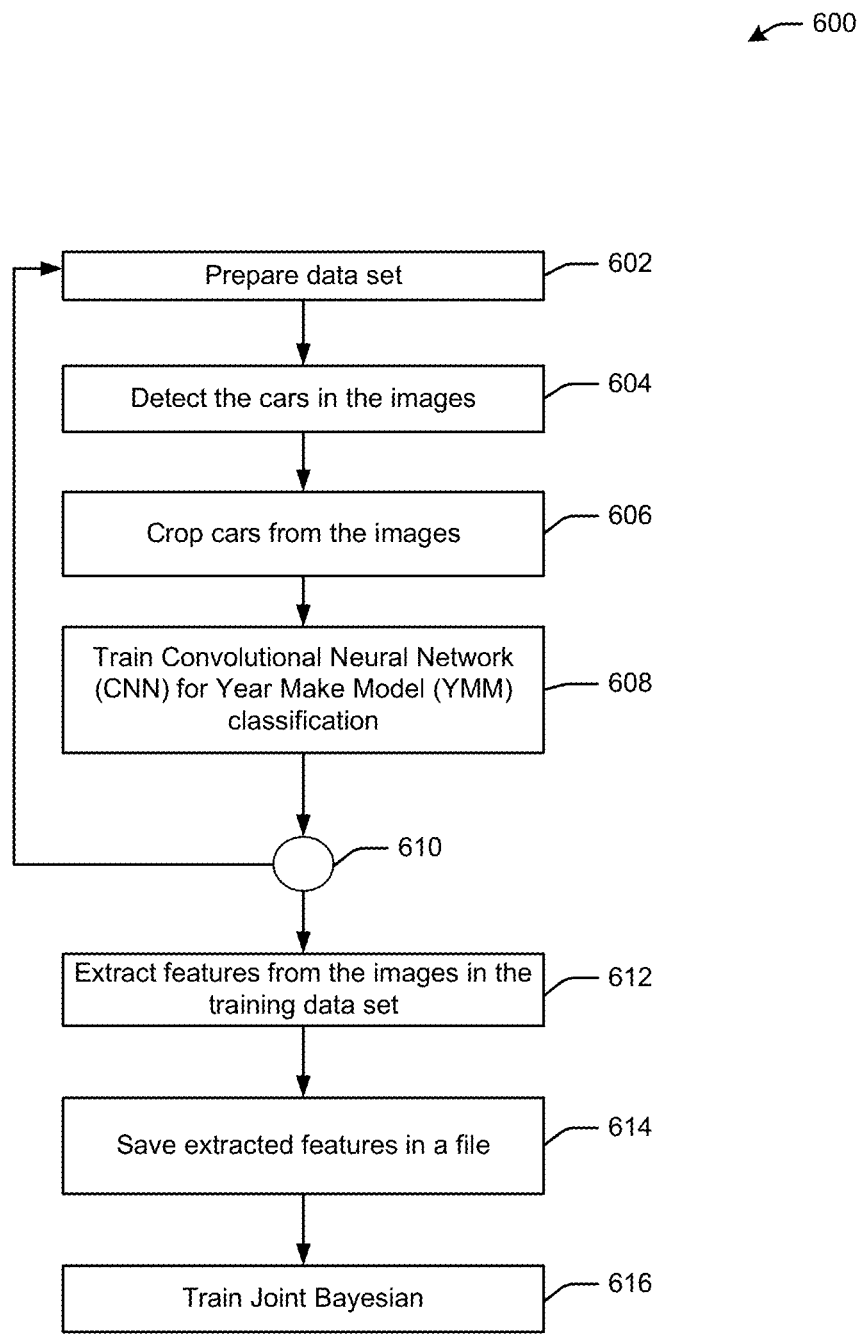
FIG. 6 depicts an exemplary flow diagram of an illustrative method for implementing vehicle classification, according to one or more example embodiments of the disclosure.

FIG. 6 depicts exemplary flow diagram 600 of an illustrative method for implementing vehicle classification, according to one or more example embodiments of the disclosure. In step 602, the at least one processor in the server may execute one or more computer executable instructions that may cause the at least one processor to prepare a data set of one or more images. For example, the at least one processor may receive one or more images forming a data set (e.g., data set 500) that may be stored in response to one or more mobile devices capturing images of different vehicles. In some embodiments, the at least one processor may analyze the data set to detect and filter the noise in the image.

In step 604, the at least one processor may detect whether a vehicle is present in the one or more images, and if so crop the vehicle out of image in step 606. The at least one processor may detect whether a vehicle is present in the one or more images by applying a regional convolutional neural network (RCNN) to the one or more images. The at least one processor may crop the vehicles from the one or more images by executing one or more instructions that cause the at least one processor to apply a vehicle surrounding region to the vehicle detected in each of the one or more images.

In step 608 the at least one processor may train a convolutional neural network (CNN) for year make and model (YMM) classification. The one or more instructions executed by the at least one processor may be the same as the instructions executed by the at least one processor to implement the CNN described above with reference to step 408 in FIG. 4. For example, the CNN may operate on a training set of vehicle images and extract (crop out) discriminative features from the vehicle images and may compare the discriminative features to discriminative features associated with vehicle images in a test set of vehicle images. This may enable the CNN to be fine-tuned by training it end-to-end with back propagation and stochastic gradient descent to determine a vehicle make, model, and year classification task. In some embodiments, the CNN may be fine-tuned on a large-scale vehicle data set, which may train the at least one processor to adaptively determine the domain in which the vehicles are in the images. The fine-tuning of the CNN on the large-scale vehicle data set may be adapted to the target domain using a private data set of vehicles built by a third party (e.g., Cox Automotive). The fine tuning may occur after step 608 and may be implemented by the at least one processor in steps 602-608 after each time the at least one processor executes steps 602-608, and returns to step 602 at step 610.

In step 612 the at least one processor may execute at least one computer-executable instructions that may cause the at least one processor to extract features from the images in the training data set. The at least one processor may extract the features from the images using the CNN. After the at least one processor extracts the features from the data set, the at least one processor may save the extracted features in a file (step 614). In step 616, the at least one processor may execute one or more computer-executable instructions that may cause the at least one processor to train the at least one processor to classify the features based on a joint Bayesian ratio as explained above with reference to FIGS. 3 and 4. In some embodiments, a multinomial logistic regression may be applied to the extracted feature of the CNN to classify the features by receiving one or more object classes from the CNN.

Figure 7:
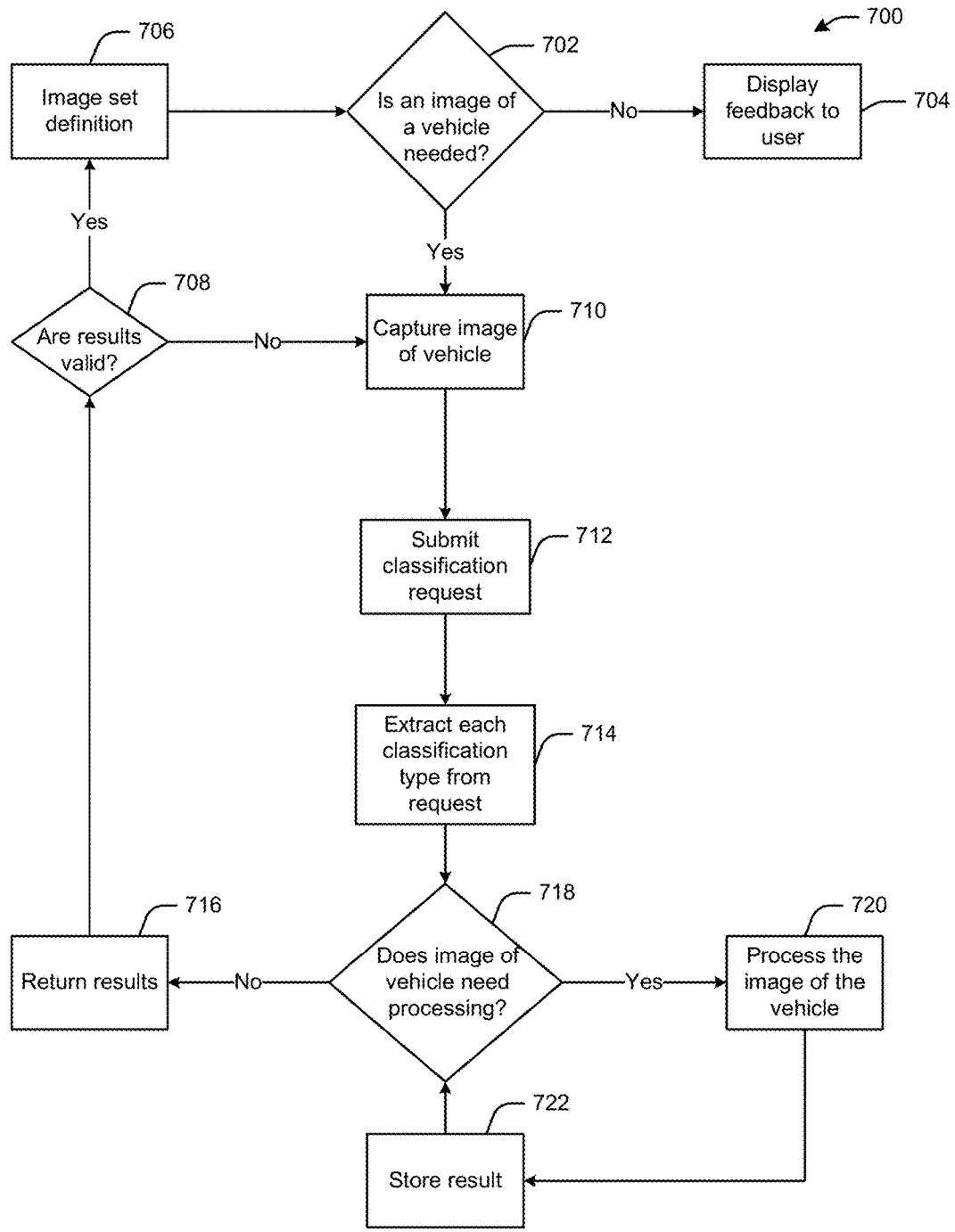
FIG. 7 depicts an exemplary flow diagram of an illustrative method for implementing vehicle classification, according to one or more example embodiments of the disclosure.

FIG. 7 depicts an exemplary flow diagram of an illustrative method for implementing vehicle classification, according to one or more example embodiments of the disclosure. Method 700, may begin n step 702, wherein the method determines if an image has needed. If an image is not needed, the method may progress to step 704 and display to a user on a mobile device that an image is not needed before a program executing the method can perform vehicle classification. Returning to step 702, the method may progress to step 710 if an image of a vehicle is needed. At step 710, the mobile device may indicate to a user that an image of a vehicle is necessary, in order for vehicle classification to be performed. The method may capture an image of the vehicle using the mobile device, and may progress to step 712 where the method may submit a classification request to a server. For example, the mobile device may submit the classification request to the server using a cellular network or Wireless Local Area Network (WLAN) such as a wireless-fidelity (Wi-Fi) network. The classification request may comprise a plurality of classification types associated with the image of the vehicle. For example, the classification types may include vehicle views classification, MMY range classification, and/or vehicle quality assurance analysis classification.

Vehicle views classification may include classifying the vehicle based on a plurality of views of other vehicles in images stored in the server. The images stored in the server may be used to generate a model that can be used to classify a view of the vehicle in the image. The model may be pre-trained with several hundred images (e.g., 350+ images) per view. In some embodiments, there may be seventeen total views associated with the model. The views may include, but are not limited to, an exterior front right view of a vehicle, an exterior left front view of the vehicle, an exterior central view of the vehicle, an exterior right rear view of the vehicle, an exterior left rear view of the vehicle, and an exterior center rear view of the vehicle. The views may also include, interior views of the vehicle, including a view of the steering wheel, engine, an interior right front view of the vehicle, an interior left front view of the vehicle, an interior left rear view of the vehicle, a manufacturers tag, odometer, driver door paneling, center dash, cargo area, or sunroof. The classification may be performed by inputting the image of the vehicle into a CNN, similar to the one described above, which then outputs a vector with an estimated probability for each of the seventeen views. The vector with the highest probability assigned to it may determine that the CNN has correctly identified the correct view of the image of the vehicle. The probabilities associated with each of the vectors may be determined by the method determining an L-2 norm of each of the vectors.

The MMY range classification may be based at least in part on seven images for each of the seventeen views associated with the vehicle views classification. For example, the method may gather seven images per make, model, year range for six views of the vehicle (e.g., an exterior front center view of the vehicle, an exterior front left view of the vehicle, an exterior front left view of the vehicle, an exterior rear left view of the vehicle, an exterior rear right view of the vehicle, and an exterior rear center view of the vehicle). As a result, there may be a total of 42 images for each MMY range. The method may then merge the images associated with the exterior views of the front of the vehicle and merge the images associated with the exterior views of the rear of the vehicle. As a result the method may then classify the images associated with the exterior views of the front of the vehicle as exterior views of the front of the vehicle, and may classify the images associated with the exterior views of the rear of the vehicle as exterior views of the rear of the vehicle. Each of the images associated with the exterior views of the front of the vehicle and the rear of the vehicle may be cropped using a car detection model. The model may use one image from the MMY range per view as a test sample, and the remaining images are used to train the model. In order to account for augmentation of the color intensities in a captured image, the model may mirror and/or alter the intensities of an red, green, blue (RGB) channel to account for the augmentation. The accuracy associated with correct detection of the MMY range may be 89.01% for make, 89.96% for model, and 94.16% for year of a vehicle in an image using a CNN to determine the MMY range.

The method may implement the MMY range classification on the captured image of the vehicle, by cropping the vehicle from the image, and the cropped vehicle may be applied to the CNN which may output a probability for each of 2,200 classes, wherein 2,200 classes is based on 1,110 different vehicles that have two exterior views (exterior views of the front of the vehicle and exterior views of the back of the vehicle). The top five classes may be selected from the 2,200 classes and may be tagged only to indicate the make, model, and year range of the vehicle in the captured image of the vehicle.

Vehicle quality assurance analysis classification may cause the method to check the captured image of the vehicle for a detection of blurriness, a detection of exposure, and/or a check for proper alignment associated with a cropped image of the vehicle. The level of blurriness may be determined based at least in part on, a Laplacian variance of the cropped image, blur from motion of a camera as the captured image of the vehicle was taken, wavelets analysis, and canny edge patches analysis. The level of exposure detection may be based at least in part on the cropped image's exposure being above a certain threshold, or being below the certain threshold. The check for proper alignment may be based at least in part on a vehicle detection, detecting parts of the vehicle, and view classification to assure that the frame of the captured image of the vehicle is correct. For example, for the exterior views mentioned above the following checks may be performed by this method, or another method, to ensure that the frame of the captured image was properly aligned.

For exterior front center views of the vehicle, the side mirrors may be detected by taking the bottom coordinates of the side mirrors and estimating the lowest point from a windshield of the vehicle. The method may measure a distance from the lowest point to a third of the image height from top to bottom. If the distance is lower than a threshold, then the method may estimate that the captured image is properly aligned.

For exterior front left views of the vehicle, the left headlight, of the vehicle, may be detected by measuring the distance from the rearmost point of the headlight to a third of the image width from the left to the right. The method may detect the left side mirror and take the bottom coordinates of the side mirrors and estimating the lowest point from a windshield of the vehicle. The method may measure a distance from the lowest point to a third of the image height from top to bottom. If the distance is lower than a threshold, then the method may estimate that the captured image is properly aligned.

For exterior front right views of the vehicle, the right headlight, of the vehicle, may be detected by measuring the distance from the rearmost point of the headlight to a third of the image width from the right to the left. The method may detect the right side mirror and take the bottom coordinates of the side mirrors and estimating the lowest point from a windshield of the vehicle. The method may measure a distance from the lowest point to a third of the image height from top to bottom. If the distance is lower than a threshold, then the method may estimate that the captured image is properly aligned.

For exterior rear left views of the vehicle, the left taillight, of the vehicle, may be detected by measuring the distance from the most forward point of the taillight to a third image of the image width from right to left. The method may detect the left side mirror and take the bottom coordinates of the side mirrors and estimating the lowest point from a windshield of the vehicle. The method may measure a distance from the lowest point to a third of the image height from top to bottom. If the distance is lower than a threshold, then the method may estimate that the captured image is properly aligned.

For exterior rear right views of the vehicle, the right taillight, of the vehicle, may be detected by measuring the distance from the most forward point of the taillight to a third image of the image width from left to right. The method may detect the right side mirror and take the bottom coordinates of the side mirrors and estimating the lowest point from a windshield of the vehicle. The method may measure a distance from the lowest point to a third of the image height from top to bottom. If the distance is lower than a threshold, then the method may estimate that the captured image is properly aligned.

In some embodiments, the driver's door panel may be used to measure the distance to the left and bottom borders as a percentage against the image size. If both percentages are below a predetermined threshold, the method may determine that the captured image is properly aligned. In other embodiments, the center dash may be used to measure the distance to the borders both horizontally. The method may then calculate a difference between left and right margins as a percentage against the image size, and if the percentage is below a predetermined threshold then the captured image is determined to be properly aligned. Yet still in other embodiments, a manufacturer's tag may be used to measure a distance to the measure the distance to the borders both horizontally. The method may then calculate a difference between left and right margins as a percentage against the image size, and if the percentage is below a predetermined threshold then the captured image is determined to be properly aligned. In other embodiments, a steering wheel may be used to measure the distance to the borders both horizontally and vertically. The method may calculate a difference between left and right margins and between top and bottom as a percentage against image size. If both percentages are below a predetermined threshold, then the captured image is determined to be properly aligned.

Returning to step 714, after each classification type has been extracted, the method may progress to step 718 to determine if the captured image requires processing. If the method determines that the captured image requires processing, the method may progress to step 720 and may process the captured image of the vehicle in accordance with FIG. 8. If the method determines that the captured image does not require processing the method may progress to step 716 where the method may return the results to either the server itself or the mobile device. In either case, the method may progress to step 708 and determine if the results are valid. If the results are determined to be valid in step 708, the method may progress to step 706, and may set a definition for all future captured images. If instead at step 708, it is determined that the results are not valid, the method may progress back to step 710 and capture another image of the vehicle. After the method processes the image of the vehicle in step 720 the method may store processed image (result) and the method may progress back to step 718.

Figure 8:
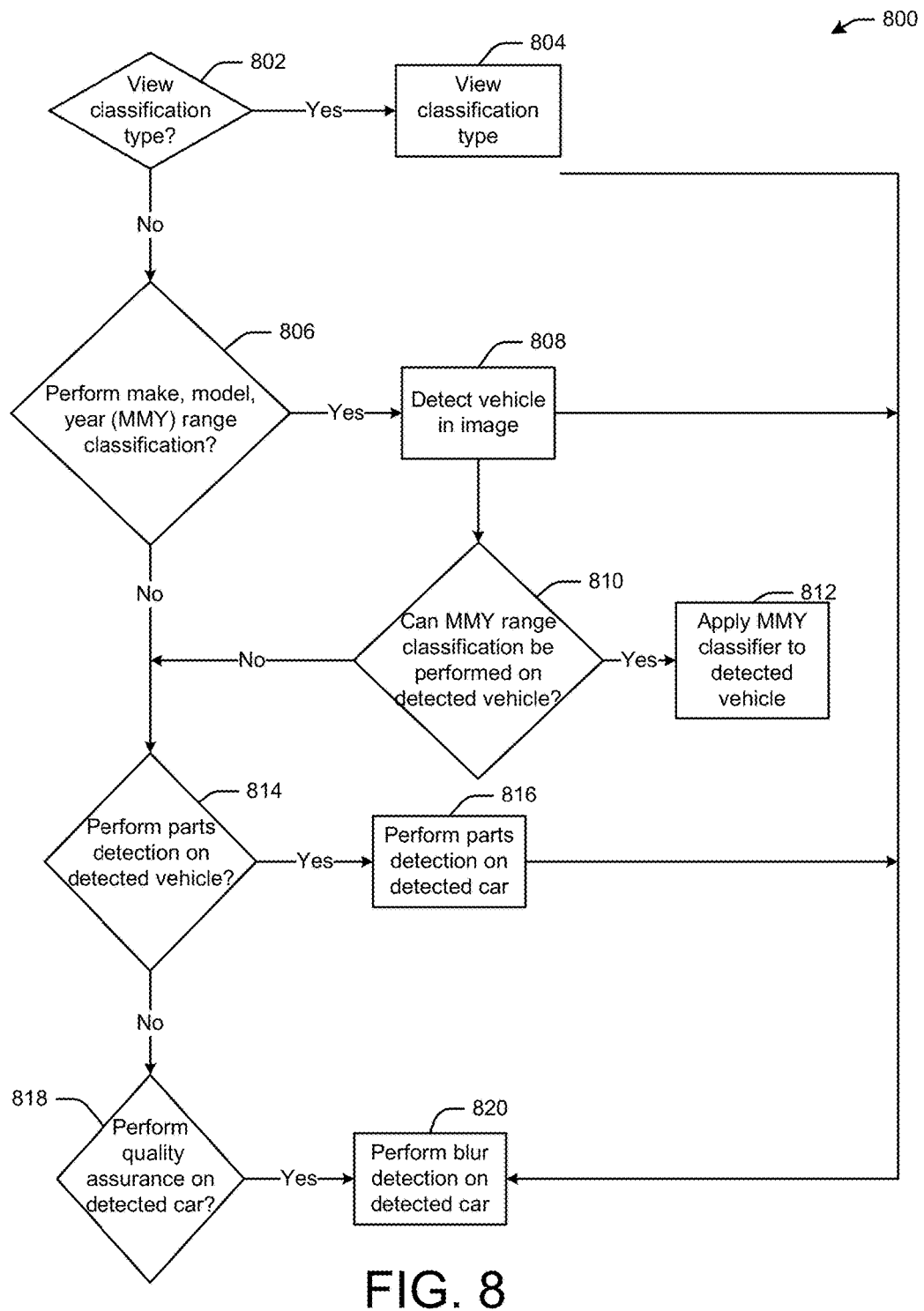
FIG. 8 depicts an exemplary flow diagram of an illustrative method for implementing vehicle classification, according to one or more example embodiments of the disclosure.

FIG. 8 depicts an exemplary flow diagram of an illustrative method for implementing vehicle classification, according to one or more example embodiments of the disclosure. Method 800 may begin, wherein the method may determine that it has received a request to process the image of the vehicle in step 720. In step 802, the method may determine whether vehicle view classification type has been selected. If vehicle view classification type has been selected, the method may progress to step 804 where the method may perform vehicle views classification on the image of the vehicle from FIG. 7 as explained above. After the method performs vehicle views classification on the image of the vehicle, the method may progress to step 820, wherein the method may perform blur detection. The method my perform blur detection based at least in part on, a Laplacian variance of a cropped image of the image of vehicle. The method may also perform wavelets analysis, and canny edge patches analysis, to compensate for motion of a camera of the mobile device while the image of the vehicle was being taken.

Returning to step 802, if the view classification type is not selected, the method may progress to step 806, wherein the method may determine if MMY range classification should be performed on the image of the vehicle. If the method determines that MMY range classification should be performed on the image of the vehicle, the method may progress to step 808 and detect the vehicle in the image. The method may detect the vehicle in the image, and then the method may progress to step 810 and step 820. At step 810, the method may determine if MMY range classification can be performed on the detected vehicle. If the method determines that MMY range classification can be performed on the detected vehicle, the method may apply the MMY classifier to the detected vehicle in step 812. The MMY classifier may implement the MMY range classification explained above.

Returning to step 810, if MMY range classification cannot be performed on the detected vehicle, the method may progress to step 814. Also it should be noted that if MMY range classification was not selected in the classification request, in step 712, of FIG. 7 the method at step 806 may progress to step 814. At step 814, the method may determine if perform parts detection on the detected vehicle was selected in the classification request in step 712 of FIG. 7. If the method determines that parts detection was selected in the classification request, the method may progress to step 816, and perform parts detection on the detected vehicle. After which the method may progress to step 820. Parts detection may be based on detecting one or more of the following parts on the vehicle in the image. The list may include a front right grille, right headlight, left headlight, right fog light, left fog light, right side mirror, left side mirror, and/or logo. The list may further include a front left grille, left headlight, left fog light, left side mirror, front left tire, rear left tire. The list may further include a front right grille, right headlight, right fog light, fight side mirror, front right tire, and/or rear right tire. The list may further include rear center, left tail light, and/or right tail light. The list may further include, rear left tail light, front left tire, rear left tire, and/or left side mirror. The list may further include, rear right, right tail light, front right tire, rear right tire, and/or right side mirror.

In other embodiments the list may further include a steering wheel, engine, right rear door, right front door, left front door, sunroof, center dash, driver door panel, manufacturer tag, and/or an odometer.

Returning to step 814, it the method determines that perform parts detection was not selected in the classification request, the method may progress to step 818, and the method may determine whether to perform quality assurance. If the method determines that quality assurance was selected in the classification request. If quality assurance was selected, then the method may progress to step 820. In some embodiments, at least one of quality assurance, parts detection, MMY range classification, and/or view classification type must be selected in a classification request.

Figure 9:
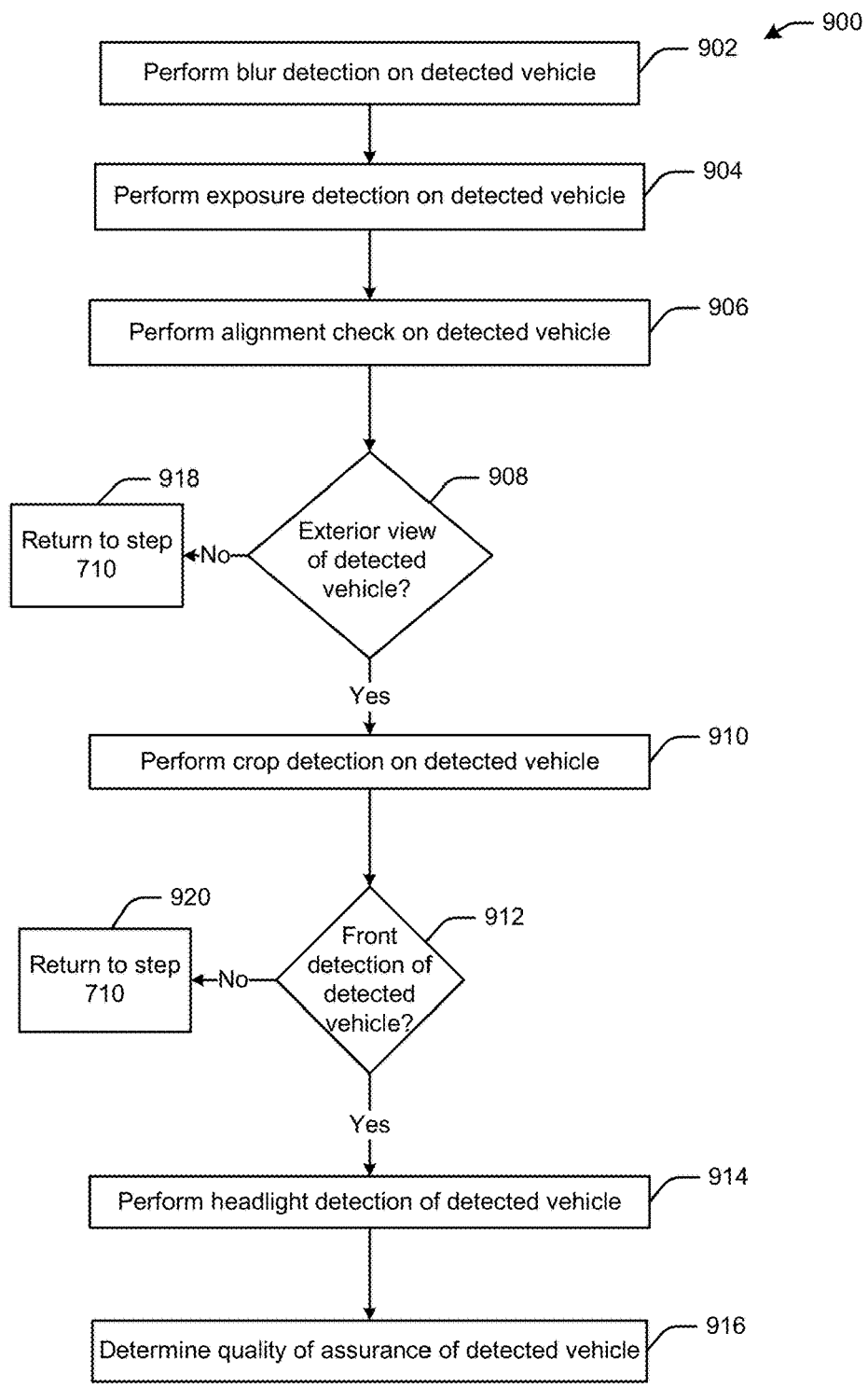
FIG. 9 depicts an exemplary flow diagram of an illustrative method for implementing vehicle classification, according to one or more example embodiments of the disclosure.

FIG. 9 depicts an exemplary flow diagram of an illustrative method for implementing vehicle classification, according to one or more example embodiments of the disclosure. Method 900 may be a method for determining a quality of assurance of image of the detected vehicle. At step 902, the method may perform blur detection on the image of the detected vehicle in step 820 of method 800. The method may then progress to step 904, and perform exposure detection on the image of the detected vehicle as explained above. After performing exposure detection, the method may progress to step 906, and may perform an image alignment check on the image of the detected vehicle. The method may perform the image alignment check as explained above. The method may then progress to step 908, and determine if the image is of an exterior view of the detected vehicle. If the image is of an exterior view of the detected vehicle, the method may progress to step 910 and may perform crop detection on the image of the detected vehicle. If the method determines that the image is not of an exterior view of the detected vehicle, the method may progress to step 710 and a new image of the vehicle may be captured. After crop detection has been performed on the image of the detected vehicle, the method may progress to step 912 and determine if the image of the detected view of the image is a detection of the front of the vehicle. If the method determines that the image of the detected view of the image is a detection of the front of the vehicle, the method may progress to step 914 and may perform headlight detection of the detected vehicle. If the method determine that the image of the detected view of the image is not a detection of the front of the vehicle, the method may progress to step 920 and the method may return to step 710 where a new image of the vehicle may be captured.

Returning to step 914, after headlight detection of the detected vehicle has been completed, the method may progress to step 916 and the method may determine quality of assurance of the detected vehicle based on at least in part on the blur detection, exposure detection, alignment check, crop detection of the detected vehicle, and the detected headlight.

Figure 10:
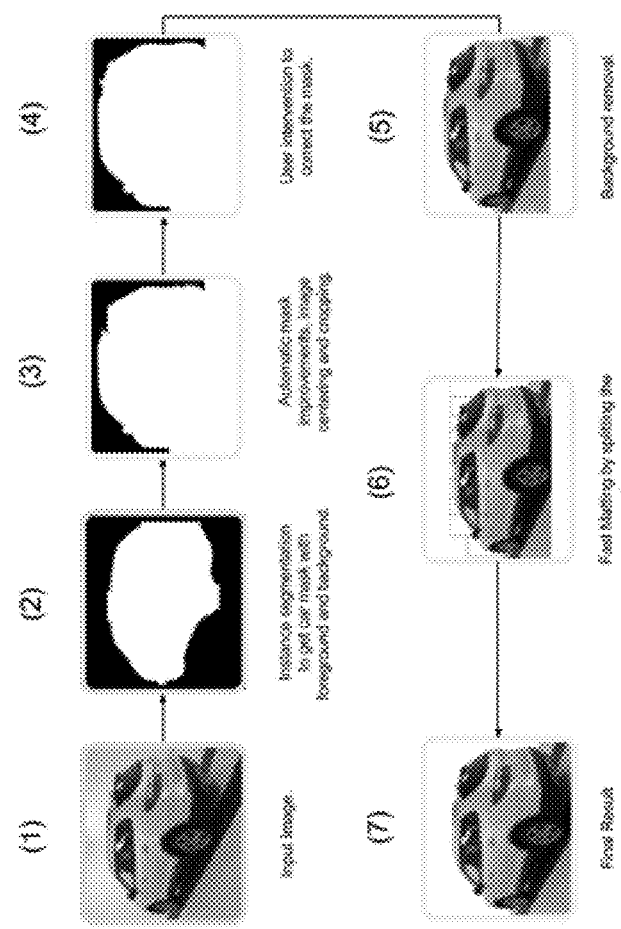
FIG. 10 depicts an exemplary images associated with a vehicle segmentation method, according to one or more example embodiments of the disclosure.

FIG. 10 depicts an exemplary images associated with a vehicle segmentation method, according to one or more example embodiments of the disclosure. Image (1) may be an image of a vehicle captured by a mobile device (e.g., mobile device 104) and more correspond to step 1102 of FIG. 11. Image (2) may be an instance segmentation of the vehicle in image (1), that may result in a car mask with a foreground and background of image (1). Image (2) may correspond to step 1104 of FIG. 11. Image (3) may be an image of an automatic mask improvement, wherein the improvement includes centering and cropping at least a portion of image (2). Image (3) may correspond to step 1108 of FIG. 11. Image (4) may represent the result of image (3) after a user has made some improvements to image (3). For example, a user may draw two lines, one in the foreground of the mask of the vehicle in image (3) and one in the background of the mask of the vehicle in image (3). This may have the effect of correcting in imperfections or aberrations of the mask of the vehicle in image (3). Image (4) may correspond to step 1114 in FIG. 11. Image (5) may be image (1) with a background (any portion of image (1) that is not the vehicle in image (1)). Image (5) may correspond to step 1118 of FIG. 11. Image (6) may be an image wherein the borders of the vehicle are split into different areas using red rectangles. Image (6) may correspond to step 1120 of FIG. 11. Image (7) may correspond to a final result of the process of removing the background in image (1). Image (7) may correspond to step 1122.

Figure 11:
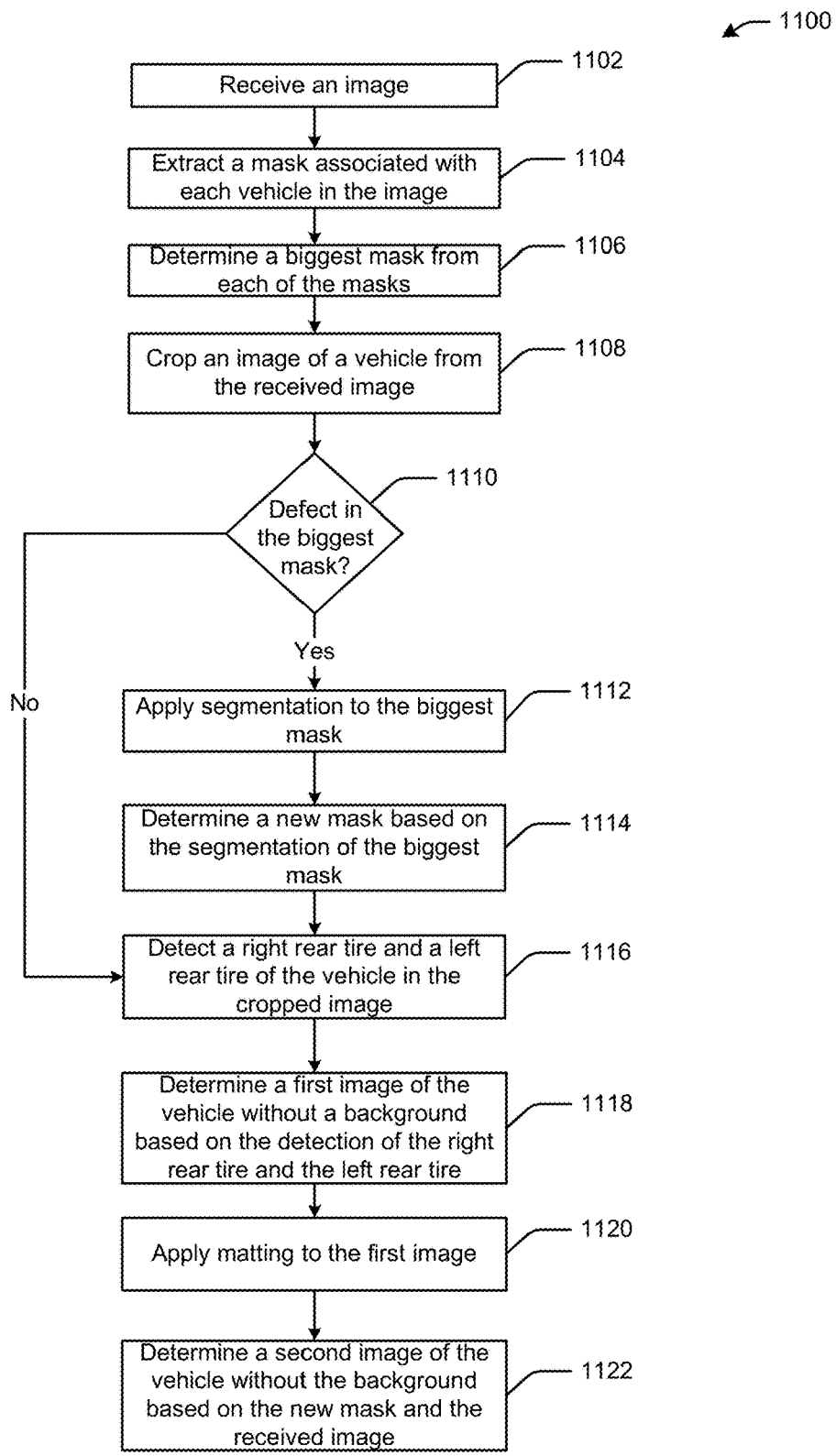
FIG. 11 depicts an exemplary flow diagram of an illustrative method for implementing vehicle classification, according to one or more example embodiments of the disclosure.

FIG. 11 depicts an exemplary flow diagram of an illustrative method for implementing vehicle classification, according to one or more example embodiments of the disclosure. Method 1100, may be a method for removing the background from an image of a vehicle. At step 1102, the method may receive an image (e.g., an image captured by a camera on a mobile device). At step 1104, the method may extract a mask associated with each image associated with each vehicle in the image. At step 1106, the method may determine a biggest mask from each of the masks. At step 1108, the method may crop an image of a vehicle from the received image. At step 1110, the method may determine if there is a defect in the biggest mask. If there is a defect in the biggest mask, the method may progress to step 1112 and apply segmentation to the biggest mask. If the method determines that there is not defect in the biggest mask the method may progress to step 1116. Returning to step 1112, the method may progress to step 1114, and may determine a new mask based at least in part on the segmentation of the biggest mask. At step 1116, the method may detect a right rear tire and a left rear tire of the vehicle in the cropped image. At step 1118, the method may determine a first image of the vehicle without a background based on the detection of the right rear tire and the left rear tire. At step 1120, the method may apply matting to the first image. At step 1122, the method may determine a second image of the vehicle without the background based on the new bask and the received image.

Figure 12:
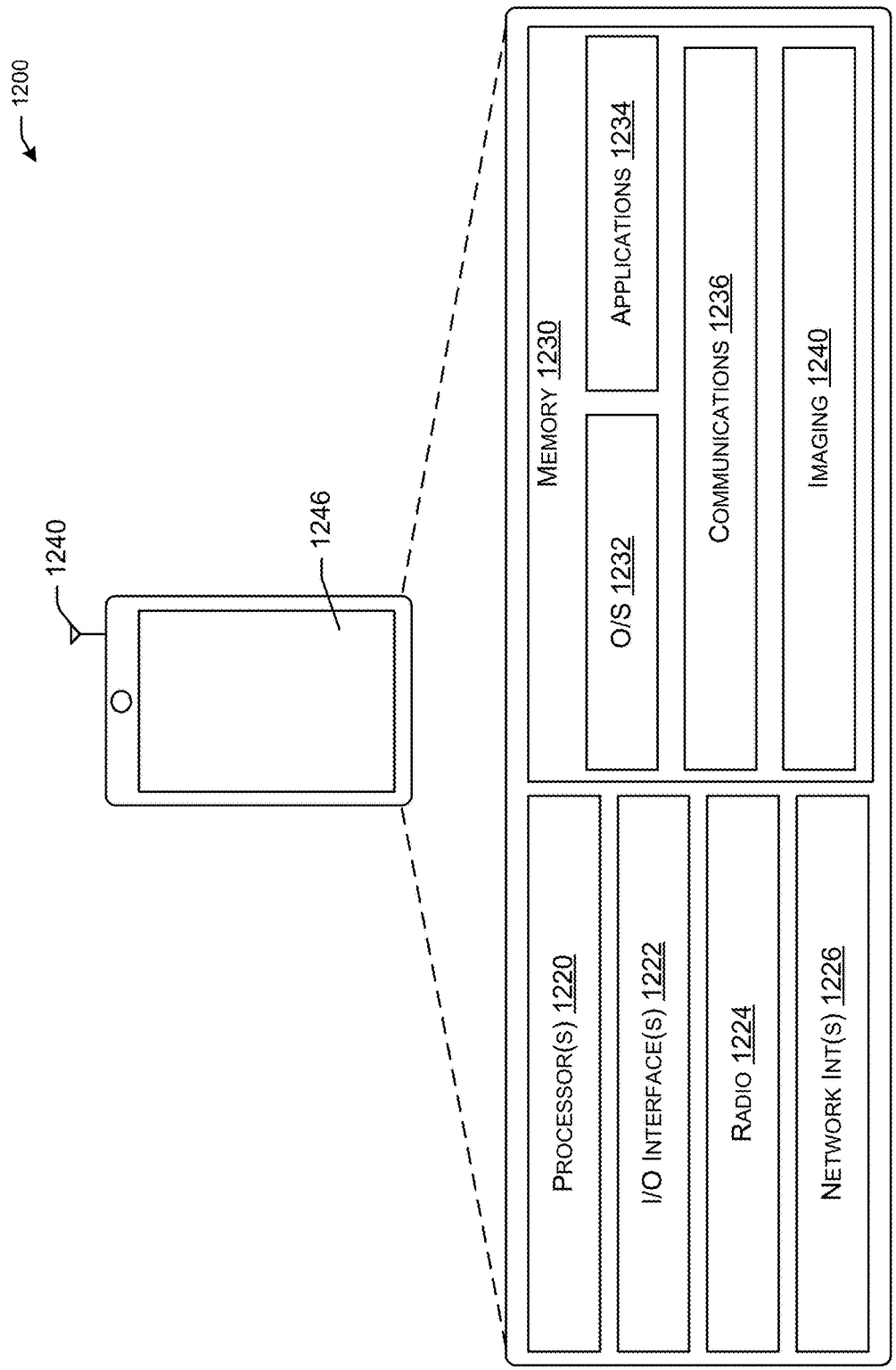
FIG. 12 depicts an exemplary architecture of a mobile device that receives images, according to one or more example embodiments of the disclosure.

FIG. 12 depicts an exemplary architecture of a mobile device that receives images, according to one or more example embodiments of the disclosure. The mobile device 104 may include one or more processor(s) 1220, input/output (I/O) interface(s) 1222, a radio 1224, network interface(s) 1226, and memory 1230.

The processors 1220 of the mobile device 104 may be implemented as appropriate in hardware, software, firmware, or combinations thereof. Software or firmware implementations of the one or more processors 1220 may include computer-executable or machine-executable instructions written in any suitable programming language to perform the various functions described. Hardware implementations of the processors 1220 may be configured to execute computer-executable or machine-executable instructions to perform the various functions described. In example embodiments, the processors 1220 may be configured to execute instructions, software, and/or applications stored in the memory 1230. The one or more processors 1220 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The mobile device 104 may also include a chipset (not shown) for controlling communications between the one or more processors 1220 and one or more of the other components of the mobile device 104. The one or more processors 1220 may also include one or more application specific integrated circuits (ASICs) or application specific standard products (ASSPs) for handling specific data processing functions or tasks.

The one or more I/O device interfaces 1222 may enable the use of one or more (I/O) device(s) or user interface(s) 1246, such as a touch sensitive screen, keyboard, and/or mouse. The user 102 may be able to administer images, sensor data, and communications phase information from the mobile device 104 by interacting with the user interfaces 1246 via the I/O interfaces 1222. The network interfaces(s) 1226 may allow the mobile device 104 to communicate via the network 106 and/or via other suitable communicative channels. For example, the mobile device 104 may be configured to communicate with stored databases, other computing devices or servers, user terminals, or other devices on the networks 106.

The transmit/receive or radio 1224 may include any suitable radio for transmitting and/or receiving radio frequency (RF) signals in the bandwidth and/or channels corresponding to the communications protocols utilized by the mobile device 104 to communicate with other server 110 via cellular base station 108. The radio component 1224 may include hardware and/or software to modulate communications signals according to pre-established transmission protocols. The radio component 1224 may be configured to generate communications signals for one or more communications protocols including, but not limited to, Wi-Fi, direct Wi-Fi, Bluetooth, 3G mobile communication, 4G mobile communication, long-term evolution (LTE), WiMax, direct satellite communications, or combinations thereof. In alternative embodiments, protocols may be used for communications between relatively adjacent mobile device 104, such as Bluetooth, dedicated short-range communication (DSRC), or other packetized radio communications. The radio component 1224 may include any known receiver and baseband suitable for communicating via the communications protocols of the mobile device 104. The radio component may further include a low noise amplifier (LNA), additional signal amplifiers, an analog-to-digital (A/D) converter, one or more buffers, and digital baseband. In certain embodiments, the communications signals generated by the radio component 1224 and transmitted via the antenna 1240 may include an in-phase component (I) and a quadrature phase component (Q), where the in-phase component and the quadrature phase component is substantially orthogonal to each other. In other example embodiments, the transmitted communications signal may be generated by alternative transceiver implementations, including, for example, all-digital polar RF transceivers where the I and Q information may be mapped from the Cartesian coordinate system to polar (amplitude and phase) coordinate systems. The radio may further be configured to measure and encode phase information such as IQ phase data onto a transmitted signal from the mobile device 104.

The memory 1230 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 1230 may store program instructions that are loadable and executable on the processor(s) 1220, as well as data generated or received during the execution of these programs. The memory 1230 may have stored thereon software modules including an operating system (O/S) module 1232, applications module 1234, communications module 1236, and imaging module 1240. Each of the modules and/or software stored on the memory 1230 may provide functionality for the mobile device 104, when executed by the processors 1220.

The O/S module 1232 may have one or more operating systems stored thereon. The processors 1220 may be configured to access and execute one or more operating systems stored in the (O/S) module 1232 to operate the system functions of the mobile device 104. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 1234 may contain instructions and/or applications thereon that may be executed by the processors 1220 to provide one or more functionality associated with the mobile device 104, including functions related to providing images, sensor data, and/or wireless communications signal phase information, as well as receiving mapping data and/or images for rendering to the user 102. These instructions and/or applications may, in certain aspects, interact with the (O/S) module 1232 and/or other modules of the mobile device 104. The applications module 434 may have instructions, software, and/or code stored thereon that may be launched and/or executed by the processors 420 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The communications module 1236 may have instructions stored thereon that, when executed by the processors 1220, enable the mobile device 104 to provide a variety of communications functionality. In one aspect, the processors 1220, by executing instructions stored in the communications module 1236, may be configured to demodulate and/or decode communications signals received by the mobile device 104 via the antenna 1240 and radio 1224. The processors 1220 may further be configured to identify one or more phase information carried on the received communications signals from the cellular base station 108. The received communications signals may further carry audio, beacons data, handshaking, information, and/or other data thereon. In another aspect, the processors 1220, by executing instructions form at least the communications module 1236, may be configured to generate and transmit communications signals via the radio 1224 and/or the antenna 1230. The processors may encode and/or modulate communications signals to be transmitted by the mobile device 104.

The imaging module 1240 may have instructions stored thereon that, when executed by the processors 1220, configure the mobile device 104 to provide a variety of imaging functions. In one aspect, the processors 1220 may be configured to initiate capturing an image via an image sensor (not shown). In some example embodiments, the processors 1220 may perform some preliminary image manipulation processes prior to transmitting the image to the server 110 via the network 106. In some other example embodiments, the processors 1220 may be configured to only transmit images that may be provide enhancements to the mapping of a particular structure.

What is claimed is:

1. A device, comprising:
    at least one memory storing computer-executable instructions; and
    at least one processor configured to access the at least one memory, wherein the at least one processor is further configured to execute the computer-executable instructions to:
        determine an image;

detect a vehicle in the image;
extract at least one first feature from the image associated with the vehicle;
classify the at least one first feature from the image based at least in part on a Bayesian ratio associated with the at least one first feature from the image and at least one second feature associated with the vehicle stored in the at least one memory;
determine a match between the at least one first feature and the at least one second feature stored in the at least one memory, based at least in part on the Bayesian ratio; and
determine a ranking of the at least one first feature among a plurality of features associated with the image in a training set.

2. The device of claim 1, wherein the image is received from a camera of a mobile device.

3. The device of claim 1, wherein the at least one processor is further configured to execute the computer-executable instructions to:
extract the at least one first feature from the image based at least in part on a cropped image of the vehicle from the image.

4. The device of claim 1, wherein the at least one processor is further configured to execute the computer-executable instructions to:
input the image to a convolutional neural network to detect the vehicle in the image.

5. A non-transitory computer-readable medium storing computer-executable instructions which, when executed by a processor, cause the processor to perform operations comprising:
determining an image;
detecting a vehicle in the image associated with the vehicle;
extracting at least one first feature from the image;
classifying the at least one first feature from the image based at least in part on a Bayesian ratio associated with the at least one first feature from the image and at least one second feature associated with the vehicle;
determining a match between the at least one first feature and the least one second feature stored in at least one memory; and
determining a ranking of the each of the at least one first feature.

6. The non-transitory computer-readable medium of claim 5, wherein the image is received from a camera of a mobile device.

7. The non-transitory computer-readable medium of claim 5, wherein the processor executes further computer-executable instructions that cause the processor to perform operations further comprising:
extracting the at least one first feature from the image based at least in part on a cropped image of the vehicle from the image.

8. The non-transitory computer-readable medium of claim 5, wherein the processor executes further computer-executable instructions that cause the processor to perform operations further comprising:
inputting the image to a convolutional neural network to detect the vehicle in the image.

9. A device, comprising:
at least one memory storing computer-executable instructions; and
at least one processor configured to access the at least one memory, wherein the at least one processor is further configured to execute the computer-executable instructions to:
detect at least one vehicle in at least one image;
train a convolutional neural network;
extract at least one feature from the at least one image associated with the vehicle; and
classify the at least one feature from the at least one image based at least in part on a Bayesian ratio associated with the at least one first feature and at least one second feature associated with the vehicle stored in the at least one memory.

10. The device of claim 9, wherein the at least one processor is further configured to execute the computer-executable instructions to:
extract the at least one first feature from the image based at least in part on a cropped image of the at least one vehicle in the at least one image.

11. The device of claim 9, wherein the at least one feature is classified based at least in part on the year, make, and model of the at least one vehicle.

12. The device of claim 11, wherein the convolutional network is trained based at least in part on a stochastic gradient descent for the year, make, and model of the at least one vehicle.

13. The device of claim 9, wherein the at least one processor is further configured to execute the computer-executable instructions to:
detect noise in the at least one image; and
filter the noise from the at least one image.

14. A non-transitory computer-readable medium storing computer-executable instructions which, when executed by a processor, cause the processor to perform operations comprising:
detecting at least one vehicle in at least one image;
train a convolutional neural network;
extract at least one feature from the at least one image associated with the vehicle; and
classify the at least one feature from the at least one image based at least in part on a Bayesian ratio associated with the at least one first feature and at least one second feature associated with the vehicle stored in a memory.

15. The non-transitory computer-readable medium of claim 14, wherein the processor executes further computer-executable instructions that cause the processor to perform operations further comprising:
extracting the at least one first features from the image based at least in part on a cropped image of the at least one vehicle in the at least one image.

16. The non-transitory computer-readable medium of claim 14, wherein the at least one feature is classified based at least in part on the year, make, and model of the at least one vehicle.

17. The non-transitory computer-readable medium of claim 16, wherein the convolutional network is trained based at least in part on a stochastic gradient descent for the year, make, and model of the at least one vehicle.

18. The non-transitory computer-readable medium of claim 14, wherein the at least one processor is further configured to execute the computer-executable instructions to:
detect noise in the at least one image; and
filter the noise from the at least one image.

* * * * *